United States Patent [19]

Okubo

[11] 4,434,878

[45] Mar. 6, 1984

[54] CLUTCH MECHANISM FOR POWER TRANSMISSION SYSTEM

[75] Inventor: Kiyokazu Okubo, Saitama, Japan

[73] Assignee: Honda Giken Kogyo Kabushiki Kaisha, Tokyo, Japan

[21] Appl. No.: 373,856

[22] Filed: May 3, 1982

Related U.S. Application Data

[62] Division of Ser. No. 208,416, Nov. 19, 1980, Pat. No. 4,373,407.

[51] Int. Cl.³ .................... F16D 47/04; F16D 41/06; F16H 35/04
[52] U.S. Cl. .................... 192/48.92; 74/650; 192/44; 192/50; 192/55
[58] Field of Search ........... 74/650; 192/44, 48.92, 192/50, 55

[56] References Cited

U.S. PATENT DOCUMENTS

| | | | |
|---|---|---|---|
| 2,481,066 | 9/1949 | Bagge | 74/650 |
| 2,966,075 | 12/1960 | Howich | 74/650 |
| 3,173,309 | 3/1965 | Seliger | 74/650 |
| 3,310,997 | 3/1967 | Biddle | 192/50 X |
| 3,447,396 | 6/1969 | Seliger | 192/50 X |
| 3,935,753 | 2/1976 | Williams | 192/50 X |

*Primary Examiner*—Allan D. Herrmann
*Attorney, Agent, or Firm*—Irving M. Weiner; Pamela S. Burt; John L. Shortley

[57] ABSTRACT

A clutch mechanism for a power transmission system including one drive member and two driven members, in which at least one pair of roller clutch members are interposed between the drive member and two driven members so as to transmit power from the drive member to the driven members independently of each other. The clutch mechanism effectively performs conventional differential and differential-locking functions with a simplified construction.

5 Claims, 6 Drawing Figures

CLUTCH MECHANISM FOR POWER TRANSMISSION SYSTEM

This is a division of application Ser. No. 208,416 filed Nov. 19, 1980, which issued as U.S. Pat. No. 4,373,407 on Feb. 15, 1983.

BACKGROUND OF THE INVENTION

1. Field of the Invention

The present invention relates to a clutch mechanism for a power transmission system, which is provided with one drive member, two driven members, and clutch members for effecting connection and disconnection between the drive and driven members. More particularly, the invention relates to a clutch mechanism for a power transmission system, which is suitable for use as the differential locking mechanism of a vehicle.

2. Description of Relevant Art

Various types of systems or devices requiring a clutch mechanism are required to have a special clutch action. For example, one such system or device is equipped with one drive member and two driven members which are rotationally driven by the drive member. Such a system or device can transmit power to the two driven members with both forward and backward rotation of the drive member, so that the clutch thereof functions as a two-way clutch. Moreover, if additional power such as an external force is exerted upon one of the driven members, such driven member can be operatively disassociated from the drive member, while the other driven member remains locked and connected with the drive member, so that the former driven member is permitted to freely rotate at a higher speed than the drive member.

A typical exemplary application wherein a clutch mechanism providing the above-described special clutch action is employed is in a three- or four-wheeled vehicle or the like which is provided with two drive wheels. In such a vehicle, a propeller shaft (i.e., the drive member) which is rotationally driven by the power of a prime mover or an engine, is connected with two axle shafts (i.e., the driven members), which are connected to respective drive wheels, when the propeller shaft rotates in either a forward or backward direction, so that the vehicle can be moved forwardly or backwardly or can be stopped by braking the engine. When the vehicle turns, the axle shaft at the turning outer side is permitted to freely rotate, while the connection between the propeller shaft and the axle shaft at the turning inner side is retained, so that the turning operation can be effected. Moreover, even when one of the drive wheels encounters slippery conditions such as on a muddy road, the vehicle can continue its travel by the driving force of the remaining drive wheel. Therefore, the clutch mechanism thus far described can perform substantially the same function as a conventional differential locking mechanism.

It is well known that conventional differential locking mechanisms are very complicated in construction and enlarged in size. Such mechanisms comprise a large number of parts including smaller and larger gears which are assembled in a gear box, and a multi-layered friction clutch which operates to prevent most of the engine power from being consumed by a drive wheel trapped on a slippery road surface. Moreover, it is impossible for such mechanisms to provide an entirely satisfactory differential locking effect due to inherent slippage of the multi-layered friction clutch.

The present invention is directed towards the provision of a novel clutch mechanism which very effectively provides the aforesaid special clutch action.

SUMMARY OF THE INVENTION

The present invention provides a clutch mechanism for a power transmission system, including one drive member and two driven members, wherein a pair of clutch members are interposed between the drive member and the two driven members, operatively connecting the drive member with respective driven members during both forward and backward rotation of the drive member, thereby permitting either one of the driven members, which is moving at a higher speed than the drive member, to be free with respect to the drive member while the other one of the driven members remains connected with the drive member.

In accordance with the present invention, it is therefore possible to employ the clutch mechanism as a differential locking mechanism of a vehicle, which is desirably simplified in construction and compact in size, and to uniformly distribute and transmit engine torque to two drive wheels of the vehicle, even when either one of the drive wheels encounters a slippery road condition which gives the drive wheel a light load, so that a complete differential locking effect is provided.

An object of the present invention is to provide a clutch mechanism for a power transmission system, which employs rollers as the aforesaid clutch members.

DETAILED DESCRIPTION OF PREFERRED EMBODIMENTS

A clutch mechanism employing a roller-type clutch member will be described hereinbelow with reference to FIGS. 1-6 in accordance with a basic embodiment of the invention and modifications thereof.

Figure 1:
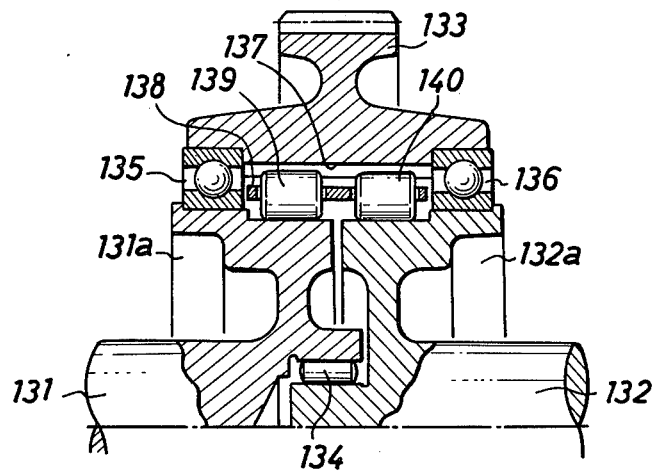
FIG. 1 is a sectioned front elevational view showing a roller-type clutch mechanism in accordance with a basic embodiment of the invention, with only the upper half being depicted because of the vertical symmetry thereof.
Figure 2:
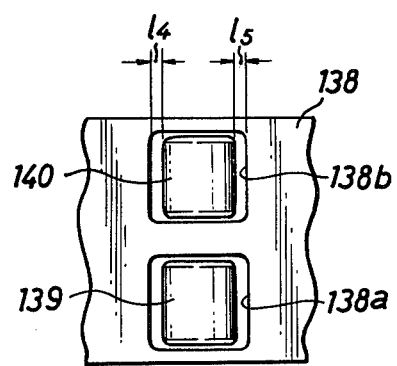
FIG. 2 is a top plan view showing a pair of rollers loosely held in a retainer.
Figure 3:
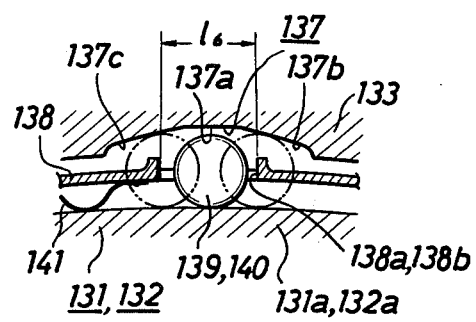
FIG. 3 is a sectioned side elevational view showing the structure in the vicinity of the roller.

As shown in FIG. 1, a drive member 133 having the shape of a ring gear is rotatably fitted through bearings 135 and 136 upon outer circumferential portions of flanged end portions 131a and 132a of driven shafts 131 and 132, which in turn are rotatable relative to each other by means of a roller bearing 134. A pair of rollers 139 and 140 are arranged for the driven shafts 131 and 132, respectively, between an inner circumferential portion of the drive member 133 and outer circumferential portions of the flanged portions 131a and 132a. As shown in FIG. 3, an inner circumferential portion of the drive member 133 is formed with a recessed cam surface 137 which extends a sufficient width in the axial direction of the drive member 133 so as to accommodate the paired rollers 139 and 140, as shown in FIG. 1. The recessed cam surface 137 is deepest at the center portion 137a thereof, in which the rollers 139 and 140 are loosely received during normal operation (i.e., when the drive member 133 is not rotating). The recessed cam surface 137 is formed symmetrically in front and at the back of the center portion 137a in the forward and backward directions of the drive member 133 with sloped surface portions 137b and 137c having depths which are gradually reduced from the center portion 137a so that the rollers 139 and 140 are locked when they have rolled into the sloped portions 137b and 137c, thus effecting connections between the member 133 and the driven shafts 131 and 140, whereby a neutral stroke $\iota_6$ between the two front and rear locked positions is provided along the recessed cam surface 137. The paired rollers 139 and 140 are commonly and loosely held in a retainer 138, which is formed with a collar shape in the rotating direction of the drive member 133, so as to be freely movable by a distance corresponding to gaps $\iota_4$ and $\iota_5$ in the rotating direction of drive member 133 within apertures 138a and 138b, which are formed in the retainer 138, as shown in FIG. 2. The stroke, which is determined by the gaps $\iota_4$ and $\iota_5$ to permit the rollers 139 and 140 to move, is smaller than the neutral stroke $\iota_6$ while satisfying an inequality of $\iota_4+\iota_5<\iota_6$. As shown in FIG. 3, a leaf spring 141 is connected at one end thereof to the retainer 138 and at the other end thereof elastically contacts the driven shafts 131 and 132 so that the retainer 138 is in frictional contact with each of the driven shafts 131 and 132 through the leaf spring 141.

Figure 4A:
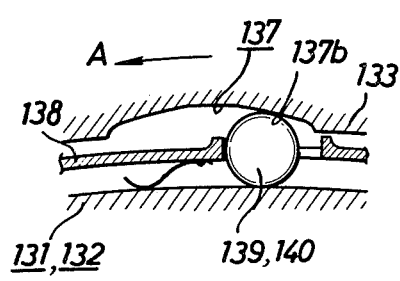
FIGS. 4 (a), (b), (c) and (d) are views for explaining the operations of the FIG. 11 structure.

When the driven member 133 rotates forwardly in the direction A, as shown in FIG. 4(a), the rollers 139 and 140 are brought into abutment against the sloped surface portion 137b of the recessed cam surface 137 and into their locked conditions, whereby the drive member 133 and the driven shafts 131 and 132 are connected through the paired rollers 139 and 140 so that the power of the drive shaft 133 is transmitted to the driven shafts 131 and 132. On the other hand, when the drive member 133 rotates in the backwards direction B, as shown in FIG. 4(c), the locking operations of the rollers 139 and 140 are effected on the sloped surface portion 137c at the backward locking position of the recessed cam surface 137 so that the driven shafts 131 and 132 are rotated in the backwards direction.

Figure 4B:
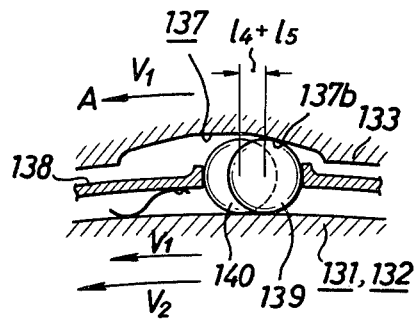
Figure 4C:
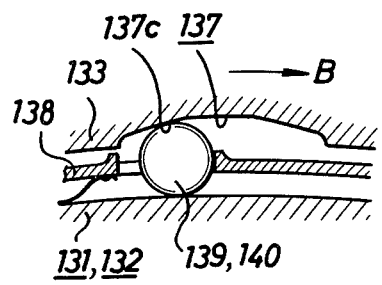

If either of the two driven shafts 131 and 132 moves at a higher speed $V_2$ than a speed $V_1$ of the drive member 131, as shown in FIG. 4(b), while the drive member 131 is rotating forwardly, the roller 140 arranged at the side of the driven shaft rotating at the speed $V_2$ is released from its locked condition shown in FIG. 4(a) and is permitted to roll in the direction A so that the retainer 138 is slidably moved in the direction A while being either pushed by the moving roller 140 or pulled by the driven shaft at the speed $V_2$. Such sliding movement of the retainer 138 is continued until the retainer 138 abuts against the back of the other roller 139 which is still held under its locked condition so that the movement of roller 140, which is released from its locked condition, is regulated by the retainer 138 which is now stopped. Because the stroke of $\iota_4+\iota_5$, by which roller 140 is permitted to move within retainer 138, is smaller than the stroke $\iota_6$ corresponding to the distance between the two locked positions defined by the sloped surface portions 137b and 137c of the recessed cam surface 137, the roller 140 cannot move to the backward locked position in the sloped surface portion 137c, but is held under its loose condition at a neutral position along the recessed cam surface 137. As a result, the driven shaft having the speed $V_2$ is freely rotatable relative to the drive shaft 133 whereas only the other driven shaft receives power through the roller 139, which remains in its locked condition, so as to be rotated at the speed $V_1$.

Figure 4D:
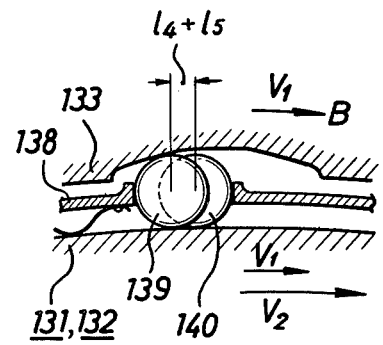

On the other hand, if either of the two driven shafts 131 and 132 assumes the speed $V_2$ while the drive shaft 133 is rotating backwards, it will be understood from FIG. 4(d) that the clutch mechanism can operate in a manner similar to the foregoing operations.

In the construction thus far described, in order to ensure the power transmission from the drive member to the driven shafts and to assure that the transmission torque capacity is sufficiently large, a plurality of pairs of rollers are arranged in the circumferential direction of the drive member and the driven shafts. Accordingly, all the rollers can be brought into uniform abutment and into their locked conditions even when pitch errors or other errors exist in the recessed cam surfaces of the drive members, which are the same in number as that of the pairs of rollers, and in the apertures of the retainer.

Modified embodiments of the roller-type clutch mechanism in accordance with the basic embodiment of the invention will be described hereinbelow.

Figure 5:
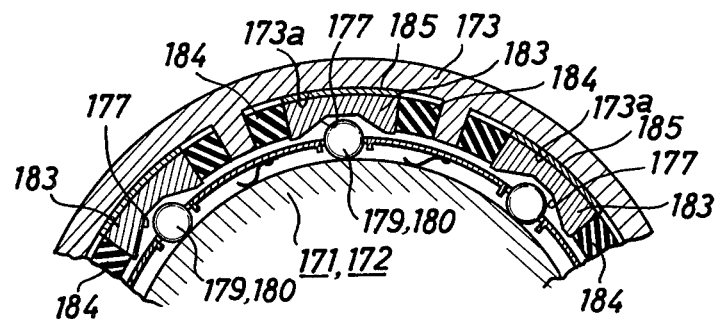
FIG. 5 is a sectioned side elevational view showing a roller-type cluch mechanism in accordance with a modified embodiment of the basic embodiment.

In a first modified embodiment shown in FIG. 5, a drive member 173 has the inner circumferential portion thereof formed with a plurality of equi-angularly spaced recessed portions 173a to thereby accommodate a cam member 183 having a recessed cam surface 177, so that elastic members 184 and 184 of rubber are disposed at the front and back of the cam member 183 in recessed portion 173a in the rotating direction of drive member 173. According to this embodiment, one of the pairs of rollers 179 and 180 first abut against a sloped portion of the recessed cam surface 177 at the initial stage of rotation of the drive member 173, whereby the cam member 183 of the roller of such pair compresses and deforms the elastic member 184 at either side according to the rotating direction of the drive member 173, thereby effecting a phase shift relative to drive member 173. The rollers 179 and 180 of the other pairs consecutively abut against sloped portions of recessed cam surfaces 177 of respective cam members 183 until the rollers of all the pairs are brought into their locked conditions.

In the construction thus far described, there is sandwiched between the bottom of the recessed portion 173a and the cam member 183 a friction reducing member 185, which has a sufficiently lower coefficient of friction than those between the recessed cam surface 177 and the rollers 179, 180 and between the rollers 179, 180 and driven shafts 171, 172 so that the cam member 183 can slide smoothly within the recessed portion 173a.

Figure 6:
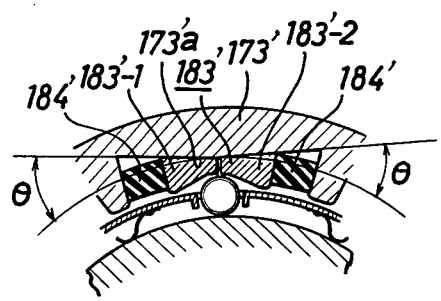
FIG. 6 is a sectioned side elevational view showing a roller-type clutch mechanism in accordance with a second modified embodiment of the basic embodiment.

In accordance with a second modified embodiment for providing smooth sliding movement of the cam member, as shown in FIG. 6, a cam member 183' may be composed of two split halves 183'-1 and 183'-2 which are attached to the front and back surfaces of a recessed portion 173'a through an elastic member 184'. The recessed portion 173'a, within which the cam member 183' is permitted to slide, may have its bottom set accurately or substantially in the tangential direction which is opened at an angle $\theta$ with respect to the rotating direction of a drive member 173'.

If the clutch mechanism according to the present invention is to be used as a differential locking mechanism of a vehicle as exemplified in the forms of respective clutch mechanisms of the roller type described hereinabove, the engine torque can be uniformly distributed to the two drive wheels, even when one of the drive wheels is trapped on a slippery road surface so that it is held under a light load condition, so that the differential locking effects can be completely accomplished.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A clutch mechanism for a power transmission system having one drive member and two driven members, comprising:
    at least one pair of roller clutch members interposed between said drive member and said two driven members so as to transmit the rotational power of said drive member to said driven members independently of each other when said drive member rotates;
    said pair of roller clutch members operatively cooperating with said drive member and said driven members such that one of said driven members, which is rotating at a higher speed than said drive member due to external force, is set free from said drive member while said power from said drive member is transmitted to the other driven member;
    said drive member being rotatably fitted on outer circumferential portions of said two driven members;
    said drive member including an inner circumferential portion provided with recessed cam surface means for loosely receiving said rollers and for locking said rollers at a front position and a rear position in the rotational direction of said drive member to thereby connect said drive member and said two driven members;
    said roller clutch members being loosely held by retaining means so as to be movable in the rotational direction of said drive member;
    said drive member having an inner circumferential portion formed with a recessed portion;
    at least one cam member having said recessed cam surface means provided thereon being disposed in said recessed portion; and
    elastic members disposed in said recessed portion at the front and rear of said cam member in the rotational direction of said drive member.

2. A clutch mechanism according to claim 1, wherein:
    said retaining means is in frictional contact with said two driven members such that the movable stroke of said rollers is smaller than the distance between said front position and said rear position.

3. A clutch mechanism according to claim 1, wherein:
    a member having a relatively low coefficient of friction is sandwiched between the bottom of said recessed portion of said drive member and each of said cam members.

4. A clutch mechanism according to claim 1, wherein:
    the bottom of said recessed portion is arranged accurately or substantially in the tangential direction with respect to the rotational direction of said drive member.

5. A clutch mechanism according to claim 1, wherein:
    said cam member comprises two split halves.

* * * * *